United States Patent [19]

Beetham

[11] 4,009,360
[45] Feb. 22, 1977

[54] ORBITAL WELDING APPARATUS

[75] Inventor: Stanley Beetham, Washington, England

[73] Assignee: Clarke Chapman Limited, Gateshead, England

[22] Filed: Oct. 2, 1975

[21] Appl. No.: 618,983

[30] Foreign Application Priority Data

Sept. 9, 1975 United Kingdom ............ 36947/75

[52] U.S. Cl. ............................................ 219/60 A
[51] Int. Cl.$^2$ .......................................... B23K 9/12
[58] Field of Search .............. 219/60 A, 124, 125 R

[56] References Cited

UNITED STATES PATENTS

| | | | |
|---|---|---|---|
| 3,400,237 | 9/1968 | Kazlauskas | 219/60 A |
| 3,409,752 | 11/1968 | Henderson et al. | 219/60 A |
| 3,688,069 | 8/1972 | Kazlauskas | 219/60 A |
| 3,823,298 | 7/1974 | Rohrberg et al. | 219/60 A |
| 3,873,798 | 3/1975 | Friedman et al. | 219/60 A |

Primary Examiner—J. V. Truhe
Assistant Examiner—N. D. Herkamp

[57] ABSTRACT

Orbital welding apparatus in which wire is fed to the welding zone by wire feed mechanism operable by differential rotation of two drive members operable at different speeds, one member carrying a welding electrode and the wire feed mechanism. Both drive members have openings allowing entry of tube to be welded. The drive members cooperate with auxiliary drive members which fit into the respective openings in the main drive members. The auxiliary drive members are guided across an opening in a housing enclosing the drive members by means of a bridge piece securable to the housing across the opening. The apparatus permits orbital welding of very closely spaced tubes without using a wire feed drive motor mounted on the rotatable assembly. Both TIG or MIG arc welding methods may be performed by the invention, or any method involving the feeding of wire into the weld zone.

5 Claims, 3 Drawing Figures

ORBITAL WELDING APPARATUS

The invention relates to orbital welding apparatus for tubes and pipes in which they are welded with their ends abutting, the tubes or pipes not being rotated.

BACKGROUND OF THE INVENTION

Orbital welding apparatus is known for: (a) butt welding of tubes using autogenous tungsten inert gas (TIG) welding; such apparatus is exemplified by U.S. Pat. Nos. 2,721,248; 3,035,147; 3,230,340; 3,238,347; 3,395,262; 3,534,199; 3,649,799; 3,780,254; and 3,823,298, and (b) butt welding of tubes using TIG welding with the addition of filler wire as exemplified by U.S. Pat. Nos. 3,409,752 (assigned to the assignee of the present applicant); 3,584,185; 3,780,254; and 3,838,244.

In all cases, in the prior proposals just mentioned, the apparatus is disclosed as having one or more of the following features:

a. overall dimensions radially of the tubes to be welded equal to several times the diameter of the tubes;

b. a housing which must be opened to allow the entry of tube to be welded; the overall opened dimensions radially of the tube is several times (at least) the diameter of the tubes when the housing is opened;

c. suitability for only very small diameter tubes;

d. ability to perform only autogenous welds without filler wire or without any feed of wire.

None of the examples of prior proposals for orbital welding apparatus mentioned above shows means for positive feeding of wire into the weld zone using mechanism requiring very small clearance radially of the tube to be welded; for example a clearance such that tube spacing may be as small as about 1 inch for tubes of 3.75 inches outside diameter.

None of the prior art examples is suitable for boiler tube welding in manufacture of boiler tube assemblies; and in the repair of damaged sections of existing boiler tube. In both cases closely adjacent tubes make it imperative that the apparatus have very small clearance requirements and be capable of being offered up to the tubes at one side thereof without the need for opening up a "head" which increases the clearance needed. The feeding of wire for either TIG or metal inert gas (MIG) welding is also essential in boiler tube welding, especially in nuclear power applications.

OBJECTS OF THE INVENTION

An object of the invention is to provide orbital welding apparatus in which the shortcomings of the prior proposals are eliminated or reduced to an extent such that they may be ignored.

A further object is to provide orbital welding apparatus in which the facility to feed wire to the weld zone is provided combined with a minimal clearance requirement radially of the tubes to be welded.

BRIEF SUMMARY OF THE INVENTION

These and other objects of the invention are achieved by orbital welding apparatus employing means to feed wire to the weld zone wherein the feeding mechanism is operable by relative rotation of two drive members each separately rotated by its own drive means. One of the drive members carries both the welding electrode and the wire feed means. Both drive members have openings allowing entry of the tube to be welded. The apparatus is constructed so as to be capable of welding tubes even when closely spaced to adjacent tubes. Other features and advantages will be found in the detailed description that follows.

DESCRIPTION OF PREFERRED EMBODIMENT

Figure 1:
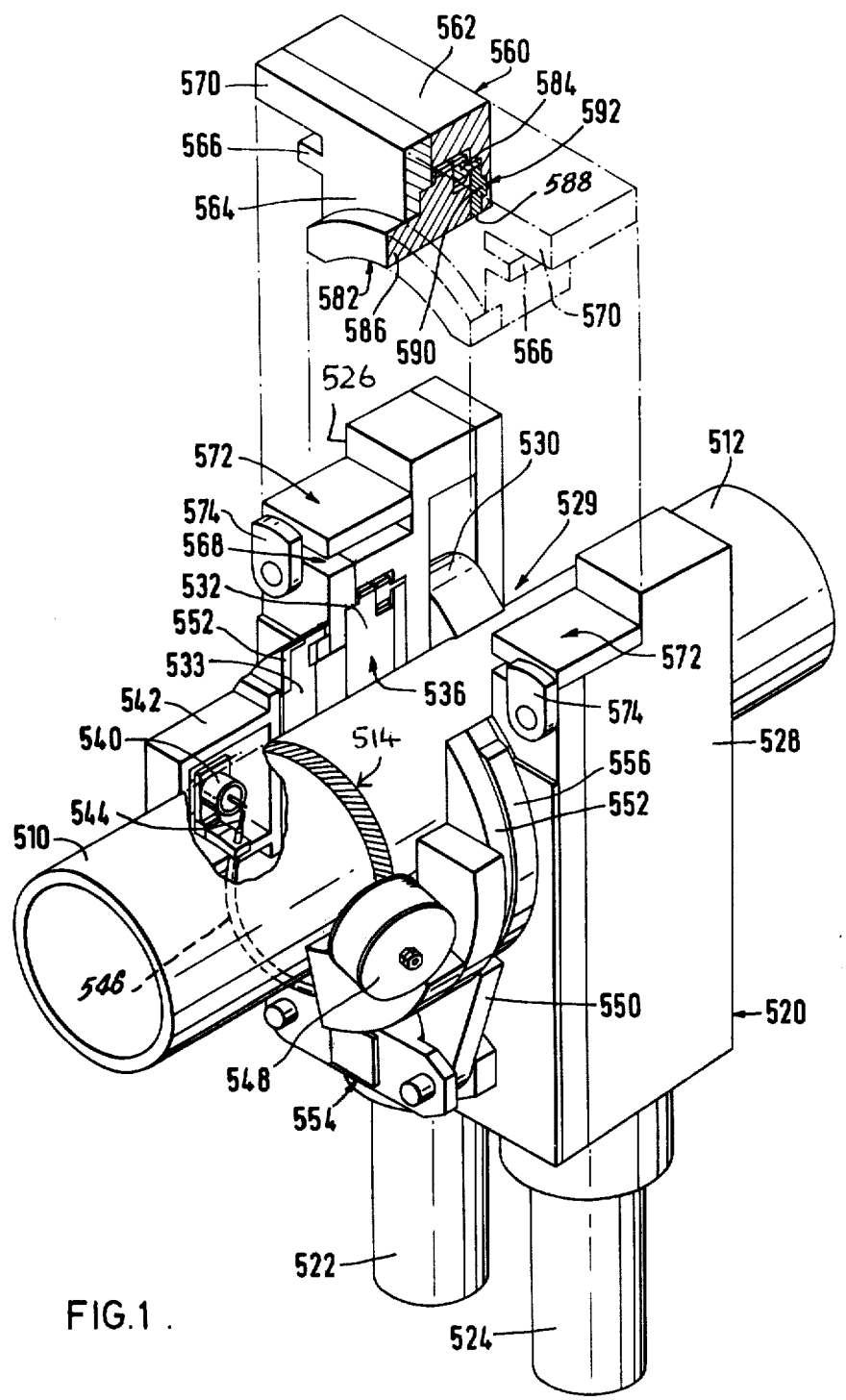
FIG. 1 is a perspective view of apparatus of the invention showing parts (the bridge-piece and auxiliary drive-members) separated from the remainder of the apparatus for clarity, the apparatus being shown positioned at tubes to be welded.
Figure 2:
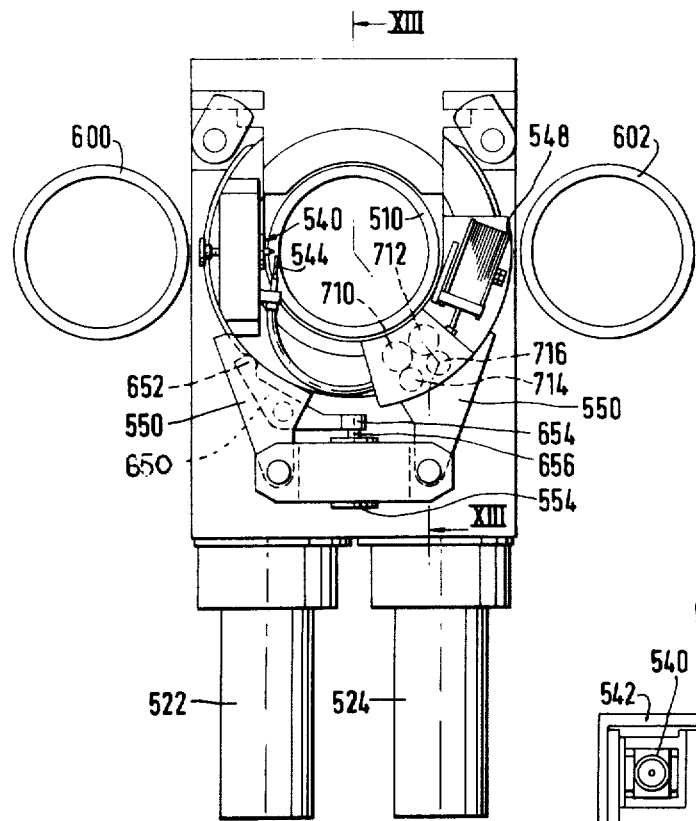
FIG. 2 is an end elevation of the apparatus shown in FIG. 1 but with all parts assembled in position to weld tubes in the presence of adjacent tubes shown in the drawing.
Figure 3:
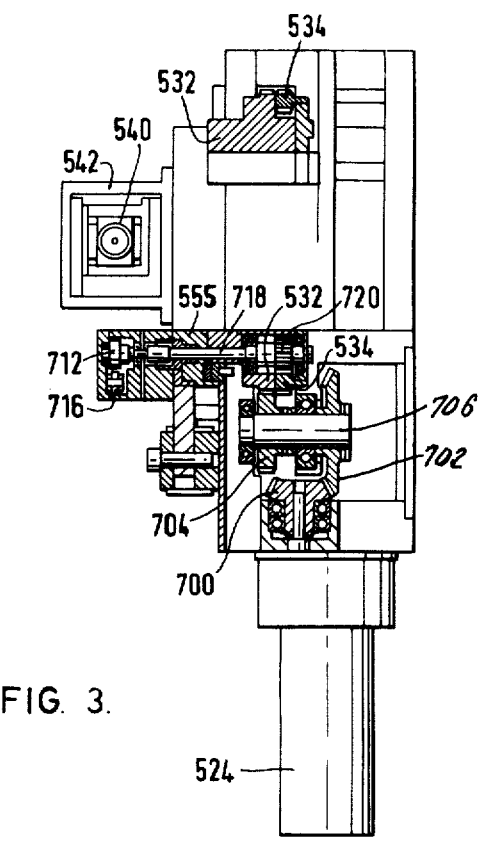
FIG. 3 is a side elevation of the apparatus shown in FIGS. 1 and 2 partly in section on the lines XIII—XIII of FIG. 2.

FIGS. 1–3 illustrate an embodiment of the invention.

FIG. 1 shows two tubes 510, 512 required to be butt-welded at a weld zone 514. Typically, the tubes 510, 512 may be for example each of 95.3 millimeter (3.752inch) outside diameter and 6 millimeter thick (0.236 inch). The apparatus comprises a housing 520 with two drive motors 522, 524 extending from the lower side of the housing 520, the housing having two upwardly-extending parallel limbs 526, 528 defining between them an opening 529 allowing entry of the tubes 510, 512 into the housing.

The housing partly encloses a clamp having a fixed jaw (now shown) engaging the underside of the tube 512 and two movable jaws, one of which is shown at 530 engaging an upper flank of the tube 512; the other movable jaw engages the opposite upper flank of the tube 512.

The housing presents internal guide-surfaces (FIG. 3) which guide two rotatable drive members 532, 534 each of which has a U-shaped opening to allow entry of the tube 512 into the member. The U-shaped openings are contiguous and are generally indicated at 536. A TIG welding torch or electrode 540 is mounted on a mounting 542 secured to the drive-member 532. Filler wire 544 is fed by wire-feed mechanism (FIG. 2) through a guide 546 from a storage reel 548 also mounted on the drive-member 532.

Welding current is fed through two sliding brushes 550, only one of which is shown in FIG. 1, which engage the periphery of a conductive plate 552 secured to a spacer member 555 mounted on the drive-member 532. The current is passed from the plate 552 to the torch 540. Inert shielding gas such as Argon, for example, is fed to the torch 540 from a gas spool-valve at 554. The valve 554 is operated in timed relationship with the rotation of the torch 540 by a peripheral surface 556 on the drive-member 532. The motor 522 drives the drive-member 534 and the motor 524 drives the drive-member 532 through gearing as described below. The housing 520 and the drive-members 532, 534 are effectively mounted on the clamp when it is operated to grip the tube 512.

The apparatus also comprises a bridge-piece 560 made up of two parts, a housing 562 and a cover 564. The bridge-piece 560 has two oppositely-extending shorter arms 566 adapted to enter corresponding opposed slots 568 on the respective limbs 526 and 528 of the housing 520. The bridge-piece 560 also has two oppositely-extending longer arms 570 above and parallel to the arms 566, which are adapted to engage shoulders 572 on the limbs 526, 528. The bridge-piece 560 can be assembled with the remainder of the housing 520 in position to bridge the opening between the limbs 526, 528 with the arms 566 in the slots 568 and the arms 570 engaging the shoulders 572 on the housing 520. The bridge-piece is retained in that position by two lugs 574, each pivotable about axes parallel to the axis of rotation of the drive-members 532, 534 so as to overlie the slots 568. The bridge-piece 560 presents auxiliary internal guide-surfaces (FIG. 1) complementary to those in the main housing by which auxiliary drive-members 582, 584 are guided for rotation with the drive-members 532, 534 respectively. When the bridge-piece 560 is so positioned, the auxiliary drive-members 582, 584 fit into the respective openings in the drive-members 532, 534 so that effectively complete annular drive members are formed for continuous driving as explained below. The auxiliary drive-member 582 is made up of two parts 586, 588. The parts 588 has a rib 590 engaging a groove 592 in the housing 562, so that optimum guidance of the auxiliary drive-members is achieved and so as to facilitate assembly of the bridge-piece 560 (and the auxiliary drive-members retained in it) to the housing 520. The drive-members 532 and 534 are of course of similar cross-sectional shape as the auxiliary drive-members though full details are not shown for simplicity.

FIG. 2 shows the tube 510 positioned adjacent neighboring parallel tubes 600, 602 which are of the same size and are equally spaced from the tube 510 at typically 276 mm (10.87 inches) centers, ie., spaced 32.7 mm (1.28 inch) between their closest points. The overall dimension of the apparatus aong the line of tube centers is 177.8 mm (7 inches); there is thus a small clearance as shown between the apparatus and the neighboring tubes at each side. FIG. 2 also shows a lever 650 having one end 652 formed as a cam-follower engaging the cam surface of the drive member 532 and the other end 654 engaging the operating stem 656 of the valve 554.

FIG. 3 shows the output drive from the motor 524 via a bevel gear 700, meshing with a bevel gear 702 driving a spur-gear 704 through a stub-shaft 706. The spur-gear 704 meshes with external gear teeth on the drive member 532. Drive from the motor 522 is applied similarly by gears (not shown) to the drive-member 534. The wire feed mechanism, which is mounted effectively on the drive-member 532, comprises drive rollers 710, 712 which are coupled together by gears, and respective pressure rollers 714, 716. The drive roller 712 is coupled to a drive shaft 718 having a spur gear 720 meshing with gear teeth formed internally on the drive member 534. The gears 704 and 720 mesh correspondingly with external and internal teeth, respectively, formed on the auxiliary drive-members 582, 584, respectively.

OPERATION

The bridge-piece 560 and the auxiliary drive-members 582, 584 are separated from the housing 520 and the housing is offered up to the pipe 512 and clamped to it after the end of the pipe has been positioned correctly in the path of the welding torch 540. The bridge piece 560 and auxiliary drive-members 582, 584 are relatively positioned to permit the bridge-piece 560 to be positioned on the housing 520 and the auxiliary members to locate in the respective openings in the drive-members 532, 534 so as to complete the gear teeth series through 360°. The lugs 574 are set to the positions shown in FIGS. 1 and 2. The tube 510 is positioned as shown in FIG. 1.

The drive-motors 522 and 524 are then operated to traverse the welding torch about the tubes. Both motors are operated at the same speed to drive the members 532 and 534 in the same sense, at the same speed, so that there is no differential movement to cause the spur gear 720 to turn. No wire is fed to the torch at this stage. Typically a base weld run may be effected autogenously (i.e., without the use of filler wire). When filler wire is required to be fed into the weld zone, the speed of the motor 522 is varied relative to the speed of the motor 524 so as to cause the drive member 534 to turn relatively to the drive member 532 in a sense to cause the spur gear 720 to turn to drive the wire feed mechanism, in the same manner as is described in the earlier-referenced commonly-assigned U.S. Pat. No. 3,409,752. The use of the auxiliary drive-members 582, 584 enables drive to be transmitted to the drive-member assemblies by single gears (eg 704) in each case, instead of by dual gear systems as described in a commonly-assigned, simultaneously-filed, related, copending application, Ser. No. 618,979. Furthermore, drive to the wire feed mechanism is transferred by but a single gear 720 instead of the gear train described in said related copending application.

The overall dimensions of the apparatus are extremely compact and the clearance required for the rotating parts beyond the diameter of the tubes being welded is very much smaller than any previously or currently available welding apparatus. The invention also enables positive drive to be applied to the filler wire without the need for the mounting of a wire-feed drive motor on the rotating "head" of the apparatus. This means that the clearance required is kept to a minimum. Whilst the preferred construction of this embodiment employs a bridge-piece, it is within the invention for the auxiliary drive members to be connected to the main drive members by means of screws for example but the use of a bridge-piece avoids the need for any connection between the members. Although toothed meshing gearing has been described it is within the invention for the drive to the member 532 to be provided by an endless chain engaging the member 532 over a part of its length and travelling around wheels mounted on the housing 520, one wheel being driven.

The invention is not limited to any particular type of welding process but is applicable also to MIG welding and to other welding processes where wire is fed into the weld zone.

While my invention has been described in connection with specific embodiments thereof, those skilled in the art will recognize that various modifications are possible within the principles enunciated herein and thus the present invention is not to be limited to the specific embodiments disclosed.

What is claimed is:

1. Orbital welding apparatus comprising a main assembly including a support structure carrying first and second rotary drive means and being of generally U shape and having two opposed relatively fixed structure limbs to receive therebetween a tube to be welded; clamp jaws movable relative to said structure to release or grip a tube received between said structure limbs; a rotatable assembly carried by said support structure and comprising first and second relatively rotatable gear members rotatable about a common axis, said gear members each being of generally U shape and having two opposed relatively fixed limbs, said gear members being rotatable into like positions in which said gear limbs are positioned to receive said tube as it is received between said structure limbs, said first and second gear members being rotationally coupled to said first and second drive means, respectively, said rotatable assembly also comprising arc welding means including wire feed roller mechanism mounted on and for rotation as a unit with said first gear member and a wire feed gear wheel meshing with said second gear member, said feed roller mechanism being in driving connection with said wire feed gear wheel and thus being operable by relative rotation of said first and second gear members; conductive means for supplying welding current to said arc welding means; and gas duct means for supplying gas to said arc welding means; said rotatable assembly further comprising first and second auxiliary gear members removably locatable in bridging relationship to the respective gear limbs of said first and second gear members, said first and second rotary drive menas each comprising but a single driven gear wheel in driving relationship with the respective gear member and respective auxiliary gear member.

2. Orbital welding apparatus according to claim 1, in which said support structure is provided with a bridge-piece means removably locatable on said limbs of said support structure in bridging relationship to said tube to be welded, said bridge-piece means presenting guide surfaces for guiding said first and second auxiliary gear members as they traverse said first space zone during rotation with said respective first and second gear members.

3. Orbital welding apparatus according to claim 2, in which said guide surfaces of said bridge-piece means, together with mutually inter-engaged formations on both said first and said second auxiliary gear members, retain said first and said second auxiliary gear members on said bridge-piece means facilitating simultaneous removal and replacement of said bridge-piece means and said first and second auxiliary gear members relative to said limbs of said support structure.

4. Orbital welding apparatus according to claim 1, and further comprising valve means interconnected with said gas duct, and a cam follower operatively connected to said valve means, said first gear member having a contoured rotary cam surface engaged by said cam follower.

5. Orbital welding apparatus according to claim 1, in which said first gear member has an electrically conductive surface means extending around said member except where interrupted and connected by conductor means to said arc welding means and in which said surface means is engaged by two electrically conductive feeder means mounted on said support structure, said surface, conductor and feeder combining to provide part of said conductive means for supplying welding current to said arc welding means.

* * * * *